(12) United States Patent
Kang et al.

(10) Patent No.: US 10,564,467 B2
(45) Date of Patent: Feb. 18, 2020

(54) LIQUID CRYSTAL DISPLAY DEVICE AND METHOD FOR DRIVING THE SAME

(71) Applicant: Samsung Display Co., Ltd., Yongin-si (KR)

(72) Inventors: Jong Hyuk Kang, Suwon-si (KR); Hyun Min Cho, Seoul (KR); Jae Byung Park, Seoul (KR); Jae Woong Kang, Jeonju-si (KR); Dae Hyun Kim, Hwaseong-si (KR); Suk Sun Lee, Yongin-si (KR); Joo Yeol Lee, Seoul (KR); Hyun Deok Im, Seoul (KR); Sung-Jin Hong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 4 days.

(21) Appl. No.: 14/993,743

(22) Filed: Jan. 12, 2016

(65) Prior Publication Data
US 2016/0320664 A1    Nov. 3, 2016

(30) Foreign Application Priority Data

Apr. 30, 2015  (KR) .................... 10-2015-0062037

(51) Int. Cl.
*G02F 1/1335*  (2006.01)

(52) U.S. Cl.
CPC .. *G02F 1/133528* (2013.01); *G02F 1/133621* (2013.01)

(58) Field of Classification Search
CPC ............. G02F 1/133528; G02F 1/1368; G02F 1/133621; G02F 1/133512;
(Continued)

(56) References Cited

U.S. PATENT DOCUMENTS 8,471,969 B2   6/2013   Banin et al.
8,760,605 B2   6/2014   Cho et al.
(Continued)

FOREIGN PATENT DOCUMENTS

KR   1020130047198   5/2013
KR   1020130047199   5/2013
(Continued)

OTHER PUBLICATIONS

Bruhn, et al., "Controlled fabrication of individual silicon quantum rods yielding high intensity, polarized light emission", Nanotechnology, Nov. 19, 2009, pp. 1-5, 20, 505301, IOP Publishing Ltd, UK.

(Continued)

*Primary Examiner* — Paisley L Wilson
*Assistant Examiner* — Mariam Qureshi
(74) *Attorney, Agent, or Firm* — H.C. Park & Associates, PLC

(57) ABSTRACT

A liquid crystal display device which may prevent a color mixing phenomenon and a driving method thereof, the liquid crystal display device including a first substrate and a second substrate facing each other; a thin film transistor disposed inside the first substrate; a color conversion layer disposed inside the second substrate and including a plurality of quantum rods; a liquid crystal layer disposed between the first substrate and the second substrate; a first polarizer disposed outside the first substrate; and a second polarizer disposed outside the second substrate.

13 Claims, 23 Drawing Sheets

(58) Field of Classification Search
CPC ........ G02F 2001/133614; G02F 2001/133531; G02F 1/13394; G02F 2001/13398; G02F 1/133553

See application file for complete search history.

(56) References Cited

U.S. PATENT DOCUMENTS

| | | | |
|---|---|---|---|
| 8,902,384 B2 | 12/2014 | Jeon et al. | |
| 2013/0107170 A1 | 5/2013 | Gee et al. | |
| 2013/0135558 A1* | 5/2013 | Kim | G02F 1/133528 349/62 |
| 2013/0242228 A1* | 9/2013 | Park | G02F 1/133617 349/61 |
| 2013/0335799 A1* | 12/2013 | Yoon | G02B 26/02 359/227 |
| 2014/0160408 A1 | 6/2014 | Cho et al. | |
| 2016/0070136 A1* | 3/2016 | Jang | G02F 1/133514 349/61 |
| 2016/0091757 A1* | 3/2016 | Miki | G02F 1/133617 349/42 |
| 2016/0223863 A1* | 8/2016 | Mizunuma | G02F 1/133617 |
| 2016/0223870 A1* | 8/2016 | Miki | G02F 1/133617 |
| 2016/0266450 A1* | 9/2016 | Kim | G02F 1/133514 |
| 2017/0108726 A1* | 4/2017 | Yanai | G02F 1/13362 |

FOREIGN PATENT DOCUMENTS

| | | |
|---|---|---|
| KR | 1020130059222 | 6/2013 |
| KR | 1020130140462 | 12/2013 |
| KR | 101347896 | 1/2014 |
| KR | 1020140000735 | 1/2014 |
| KR | 1020140074495 | 6/2014 |
| WO | 2010095140 | 8/2010 |

OTHER PUBLICATIONS

Hu et al., "Linearly Polarized Emission from Colloidal Semiconductor Quantum Rods", Science, Jun. 15, 2001, pp. 2060-2063, vol. 292, American Association for the Advancement of Science, Washington DC, USA.

* cited by examiner

LIQUID CRYSTAL DISPLAY DEVICE AND METHOD FOR DRIVING THE SAME

CROSS-REFERENCE TO RELATED APPLICATION

This application claims priority from and the benefit of Korean Patent Application No. 10-2015-0062037, filed on Apr. 30, 2015, which is hereby incorporated by reference for all purposes as if fully set forth herein.

BACKGROUND

Field

Exemplary embodiments relate to a liquid crystal display device and a driving method thereof and, more particularly, to a liquid crystal display device which may prevent a color mixing phenomenon and a driving method thereof.

Discussion of the Background

A liquid crystal display device, which is one of the most common types of flat panel displays currently in use, includes two sheets of display panels with field generating electrodes, such as a pixel electrode and a common electrode, formed thereon, and a liquid crystal layer interposed therebetween. An electric field is generated in a liquid crystal layer by applying a voltage to the field generating electrodes, and the orientation of liquid crystal molecules in the liquid crystal layer is determined by the generated electric field, thereby controlling polarization of incident light so as to display images.

Two sheets of display panels which form the liquid crystal display device may be configured by a thin film transistor display panel and an opposing display panel. In the thin film transistor display panel, a gate line that transmits a gate signal and a data line that transmits a data signal may be formed to intersect each other. The thin film transistor display panel also includes a thin film transistor connected to the gate line and the data line, and a pixel electrode connected to the thin film transistor. In the opposing display panel, a light blocking member, a color filter, and a common electrode may be formed. In some cases, the light blocking member, the color filter, and the common electrode may be formed in the thin film transistor display panel.

Recently, a liquid crystal display device having a structure which uses a quantum material to convert a color of light emitted from a light source, thereby omitting any need for a color filter, has been developed. However, a liquid crystal display device having such a structure suffers from a problem of a color mixing phenomenon, which results from the relatively long distance between a liquid crystal layer and a color conversion layer.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display device which may prevent a color mixing phenomenon and a driving method thereof.

Additional aspects will be set forth in the detailed description which follows, and, in part, will be apparent from the disclosure, or may be learned by practice of the inventive concept.

An exemplary embodiment of the present invention discloses a liquid crystal display device including a first substrate and a second substrate facing each other; a thin film transistor disposed inside the first substrate; a color conversion layer disposed inside the second substrate and including a plurality of quantum rods; a liquid crystal layer disposed between the first substrate and the second substrate; a first polarizer disposed outside the first substrate; and a second polarizer disposed outside the second substrate.

An exemplary embodiment of the present invention also discloses a driving method of a liquid crystal display device including: providing light to a first polarizer of the liquid crystal display device; applying a voltage to a liquid crystal layer to control a polarization direction of light which passes through the first polarizer; adjusting a quantity of light which passes through the liquid crystal layer while passing through a color conversion layer including a plurality of quantum rods; and passing the light which passes through the color conversion layer through the second polarization layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
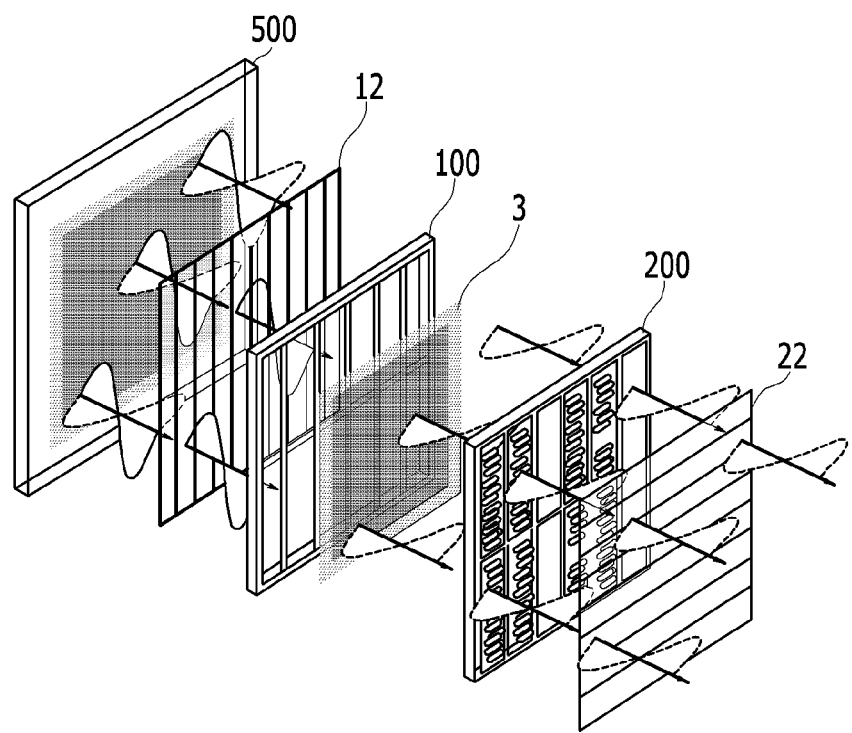
FIG. 1 is a perspective view schematically illustrating a liquid crystal display device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
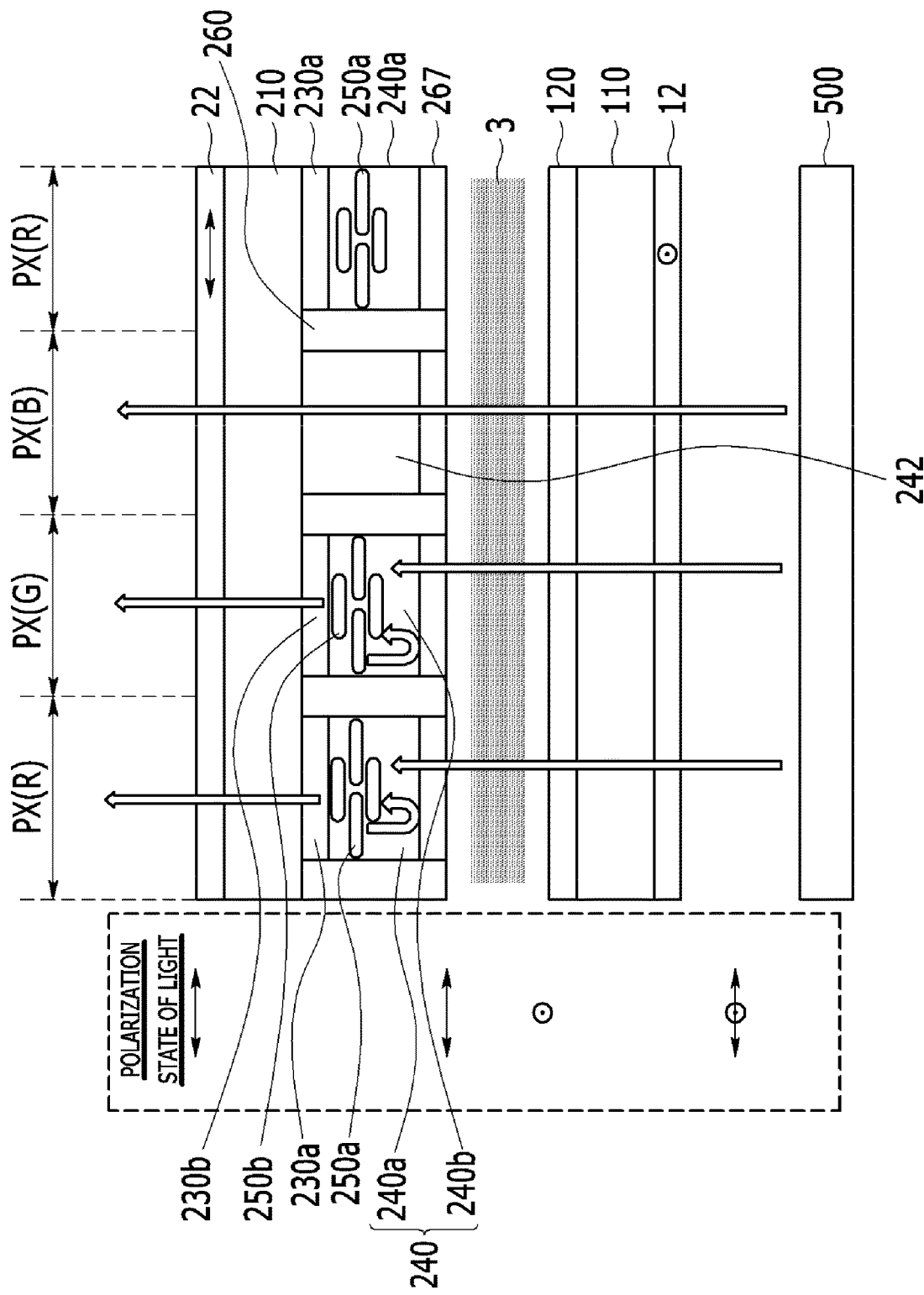
FIG. 2 is a cross-sectional view schematically illustrating a liquid crystal display device according to an exemplary embodiment of the present invention.

FIG. 1 is a perspective view schematically illustrating a liquid crystal display device according to an exemplary embodiment of the present invention, and FIG. 2 is a cross-sectional view schematically illustrating a liquid crystal display device according to an exemplary embodiment of the present invention. FIGS. 1 and 2 illustrate polarization states of light which passes through individual layers.

As illustrated in FIGS. 1 and 2, a liquid crystal display device according to an exemplary embodiment of the present invention includes a thin film transistor array panel 100 and an opposing display panel 200 which face each other, and a liquid crystal layer 3 is disposed between the thin film transistor array panel 100 and the opposing display panel 200.

The thin film transistor array panel 100 includes a first substrate 110 and a thin film transistor layer 120 disposed on the first substrate 110. The thin film transistor layer 120 is simplified and specific constituent elements will be described below. A first polarizer 12 is disposed outside the thin film transistor array panel 100.

The opposing display panel 200 includes a second substrate 210 and a color conversion layer 240 disposed on the second substrate 210. A second polarizer 22 is disposed outside the opposing display panel 200.

The first polarizer 12 and the second polarizer 22 have a transmissive axis and an absorption axis. For light that is incident onto the first polarizer 12 and the second polarizer 22, a light component which is parallel to a transmissive axis passes therethrough, and a light component that is parallel to an absorption axis does not pass therethrough. The transmissive axis of the first polarizer 12 is perpendicular to the transmissive axis of the second polarizer 22.

The color conversion layer 240 includes a first color conversion layer 240a, which includes a plurality of first quantum rods 250a, and a second color conversion layer 240b, which includes a plurality of second quantum rods 250b. The first quantum rod 250a and the second quantum rod 250b are formed of a quantum material having a nano-size rod shape. The quantum material may change a wavelength of light. The first quantum rod 250a is formed of a material which converts the incident light into red light, and the second quantum rod 250b is formed of a material which converts the incident light into green light. The first quantum rod 250a and the second quantum rod 250b have predetermined directivities. The first quantum rod 250a and the second quantum rod 250b are arranged in a predetermined direction, and a rod shaped length direction is referred to as an "arrangement direction".

The first substrate 110 and the second substrate 210 include a first color pixel area PX(R), a second color pixel area PX(G), and a third color pixel area PX(B). The first color conversion layer 240a is disposed in the first color pixel area PX(R), and the light which is incident onto the first color conversion layer 240a is converted into red light and escapes the first color conversion layer 240a. The second color conversion layer 240b is disposed in the second color pixel area PX(G), and the light which is incident onto the second color conversion layer 240b is converted into green light and escapes the second color conversion layer 240b. A transparent photo resist 242 is disposed on the third color pixel area PX(B). The transparent photo resist 242 is transparent and light which is incident onto the transparent photo resist 242 escapes the transparent photo resist. The transparent photo resist 242 is disposed on the same layer as the first color conversion layer 240a and the second color conversion layer 240b.

Partitions 260 are formed between the first color conversion layer 240a and the second color conversion layer 240b, between the second color conversion layer 240b and the transparent photo resist 242, and between the transparent photo resist 242 and the first color conversion layer 240a. That is, the partitions 260 are disposed at boundaries between the pixel areas PX(R), PX(G), and PX(B).

The first blue light blocking filter 230a and the second blue light blocking filter 230b are disposed on the second substrate 210. The first blue light blocking filter 230a is disposed in the first color pixel area PX(R) and between the second substrate 210 and the first color conversion layer 240a. The second blue light blocking filter 230b is disposed in the second color pixel area PX(G) and between the second substrate 210 and the second color conversion layer 240b. The first blue light blocking filter 230a and the second blue light blocking filter 230b block the blue light by absorbing or reflecting the blue light component so that the block light component does not pass therethrough. The first blue light blocking filter 230a passes the red light and blocks the blue light. The second blue light blocking filter 230b passes the green light and blocks the blue light.

A blue band pass filter 267 is formed on the first color conversion layer 240a, the second color conversion layer 240b, and the transparent photo resist 242. The blue band pass filter 267 is formed in the first color pixel area PX(R), the second color pixel area PX(G), and the third color pixel area PX(B). The blue band pass filter 267 is disposed between the first color conversion layer 240a and the liquid crystal layer 3, between the second color conversion layer 240b and the liquid crystal layer 3, and between the transparent photo resist 242 and the liquid crystal layer 3. The blue band pass filter 267 is a filter which passes the blue light as it is.

The liquid crystal display device further includes a light source 500, and light emitted from the light source 500 passes through the first polarizer 12 to be incident onto the first substrate 110. The light source 500 may emit blue light and, for example, may be formed of a blue light emitting diode (LED).

Hereinafter, a polarization state of light which passes through the liquid crystal display device according to exemplary embodiments of the present invention will be described.

The light emitted from the light source 500 is non-polarized light and includes both a component which vibrates in a horizontal direction a component which vibrates in a vertical direction. Two components of the light are represented by a dotted line and a solid line in FIG. 1, and represented by an arrow in a horizontal direction and an arrow in a direction extending outward from the sheet in FIG. 2.

The non-polarized light provided from the light source 500 is changed into a polarized light while passing through the first polarizer 12. A component which vibrates in a direction parallel to the transmissive axis of the first polarizer 12 passes through the first polarizer and a component which vibrates in a direction perpendicular to the transmissive axis is blocked. The transmissive axis of the first polarizer 12 may be in a vertical direction, and the component which vibrates in a horizontal direction is blocked and the component which vibrates in a vertical direction passes therethrough.

A polarization direction of the light which passes through the first polarizer 12 is changed while passing through the liquid crystal layer 3. In this case, a variation of the polarization direction may be adjusted by adjusting a voltage which is applied to the liquid crystal layer 3. FIGS. 1 and 2 illustrate that the polarization direction is changed by 90 degrees. Accordingly, when the light that is incident onto the liquid crystal layer 3 is formed of only a component which vibrates in the vertical direction, the light which passes through the liquid crystal layer 3 may be formed of a component which vibrates in the horizontal direction.

A wavelength of the light that passes through the liquid crystal layer 3 is changed while the light passes through the color conversion layer 240. A blue light component of the light that passes through the first color conversion layer 240a is changed into a red light component by the first quantum rod 250a. A blue light component of the light that passes through the second color conversion layer 240b is changed into a green light component by the second quantum rod 250b. That is, the red light component is emitted from the first color pixel area PX(R) and the green light component is emitted from the second color pixel area PX(G). Because the transparent photo resist is formed in the third color pixel area PX(B) instead of the color conversion layer 240, the blue light component passes therethrough without changing the wavelength of the light.

The light that passes through the first color conversion layer 240*a* is mostly formed of the red light component, but may partially include the blue light component. When the blue light component passes therethrough as it is, not only red but also blue is disposed in the red pixel area PX(R). In this case, even though a user does not want to display blue, blue may be displayed. In the exemplary embodiment of the present invention, the first blue light blocking filter 230*a* blocks the blue light component which passes through the first color conversion layer 240*a*. The first blue light blocking filter 230*a* absorbs or reflects the blue light component.

The light which passes through the second color conversion layer 240*b* may be mostly formed of a green light component, but may partially include the blue light component. When the blue light component passes therethrough, not only green but also blue is disposed in the red pixel area PX(G). In this case, even though the user does not want to display blue, blue may be displayed. In the exemplary embodiment of the present invention, the second blue light blocking filter 230*b* blocks the blue light component which passes through the second color conversion layer 240*b*.

A propagation direction of some of the red light component whose wavelength is changed while passing through the first color conversion layer 240*a* is changed so that some of the red light component may reach the blue band pass filter 267. Further, a propagation direction of some of the green light component whose wavelength is changed while passing through the second color conversion layer 240*b* is changed so that some of the green light component may reach the blue band pass filter 267. In this case, the blue band pass filter 267 passes only the blue light component and reflects the red light component and the green light component to get out of the first color conversion layer 240*a* and the second color conversion layer 240*b*. The blue light component that is reflected by the first blue light blocking filter 230*a* and the second blue light blocking filter 230*b* may pass through the blue band pass filter 267.

Of the light which passes through the first color conversion layer 240*a*, the second color conversion layer 240*b*, and the transparent photo resist 242, only a component which vibrates in a direction parallel to the transmissive axis of the second polarizer 22 passes therethrough while passing through the second polarizer 22. The transmissive axis of the second polarizer 22 is perpendicular to the transmissive axis of the first polarizer 12. Therefore, the transmissive axis of the second polarizer 22 may be formed in a horizontal direction while a component which vibrates in a vertical direction is blocked, and a component which vibrates in a horizontal direction passes therethrough. In FIGS. 1 and 2, the light which passes through the liquid crystal layer 3 is formed of the component which vibrates in the horizontal direction so as to entirely pass through the second polarizer 22.

Finally, the red light component is emitted from the first color pixel area PX(R), the green light component is emitted from the second color pixel area PX(G), and the blue light component is emitted from the third color pixel area PX(B), and a quantity of light is adjusted to display a screen.

Hereinafter, a quantum dot DQ and a polarization characteristic of a quantum rod QR will be described with reference to FIGS. 3 and 4.

Figure 3:
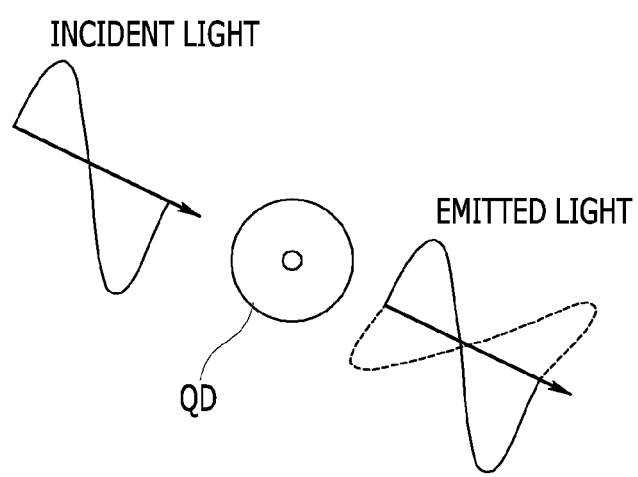
FIG. 3 is a view illustrating a polarization characteristic of a quantum dot.
Figure 4:
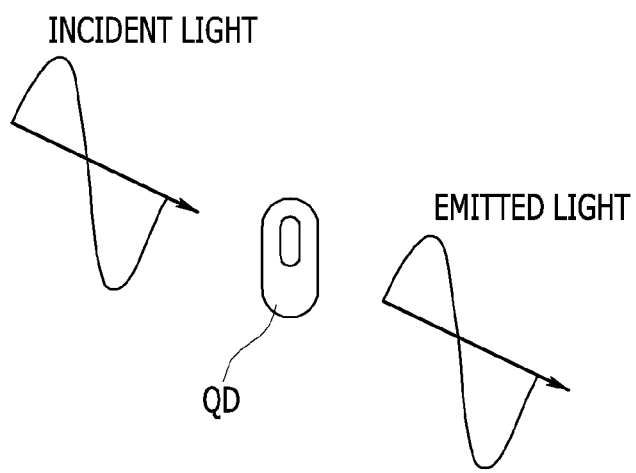
FIG. 4 is a view illustrating a polarization characteristic of a quantum rod.

FIG. 3 is a view illustrating a polarization characteristic of a quantum dot and FIG. 4 is a view illustrating a polarization characteristic of a quantum rod.

A quantum dot QD is a particle formed by several hundred to several thousands of atoms and refers to a semiconductor crystal obtained by composing the quantum in the unit of nanometers (nm). The light that is incident onto the quantum dot QD is changed into light having a different wavelength and then emitted. According to a principle of the quantum dot QD, when energy, such as ultraviolet radiation, is applied to electrons in the semiconductor material made by quantum, the electrons repeatedly jump to a high energy level by a quantum jump and then drop to a low energy level by emitting the energy. The energy emitted has various wavelengths in accordance with a size of a quantum dot. When a region of the wavelength (energy) is a visible band region (380 nm to 800 nm), various visible colors are emitted at a wavelength in the form of energy. In the case of the quantum dot QD, as illustrated in FIG. 3, even though the incident light is polarized light, the emitted light is formed of non-polarized light.

The quantum rod QR has a characteristic which changes a wavelength of light, similarly to the quantum dot QD. However, the quantum rod QR has directivity, which is different from the quantum dot QD. As described above, the quantum rod QR has a rod shape, and a plurality of quantum rods may be arranged in a predetermined direction. In the case of the quantum rod QR, as illustrated in FIG. 4, the emitted light is formed of polarized light. In this case, the quantity of passing light varies depending on an angle formed by the polarization direction of the incident light and an arrangement direction of the quantum rod QR. As an angle formed by the polarization direction of the incident light and an arrangement direction of the quantum rod QR approaches zero, the quantity of passing light is increased and, as the angle approaches 90 degrees, the quantity of passing light is reduced.

For comparison, it is assumed that in the liquid crystal display device according to the exemplary embodiment of the present invention, the quantum dot QD is included in the color conversion layer 240 instead of the quantum rod QR. In such a comparative example, regardless of the polarization direction of the light which passes through the liquid crystal layer, the light which passes through the color conversion layer is formed of non-polarized light, and the quantity of light is the same as in the exemplary embodiment. Accordingly, transmittance may be adjusted for every pixel, and the second polarizer needs to be disposed between the liquid crystal layer and the color conversion layer in order to control the transmittance for every pixel. However, when the second polarizer is disposed between the liquid crystal layer and the color conversion layer, a distance between the liquid crystal layer and the color conversion layer is increased, and the light which passes through the pixel affects adjacent pixels, which may undesirably cause a color mixing phenomenon. For example, most of light which passes through the liquid crystal layer in the first color pixel area passes through the first color conversion layer to display red, but the remaining light component escapes through the second color pixel area or the third color pixel area, which are adjacent to the first color pixel area, and displays green or blue.

In the liquid crystal display device according to the exemplary embodiment of the present invention, a quantity of light which passes through the color conversion layer 240 may be adjusted in accordance with a polarization direction of light which passes through the liquid crystal layer 3. Accordingly, the second polarizer 22 may be disposed outside the second substrate 210 and, thus, the distance between the liquid crystal layer 3 and the color conversion layer 240 may be reduced as compared with the comparative example. Therefore, a color mixing phenomenon may be prevented.

Hereinafter, a structure of the liquid crystal display device according to an exemplary embodiment of the present invention will be further described with reference to FIG. 5.

Figure 5:
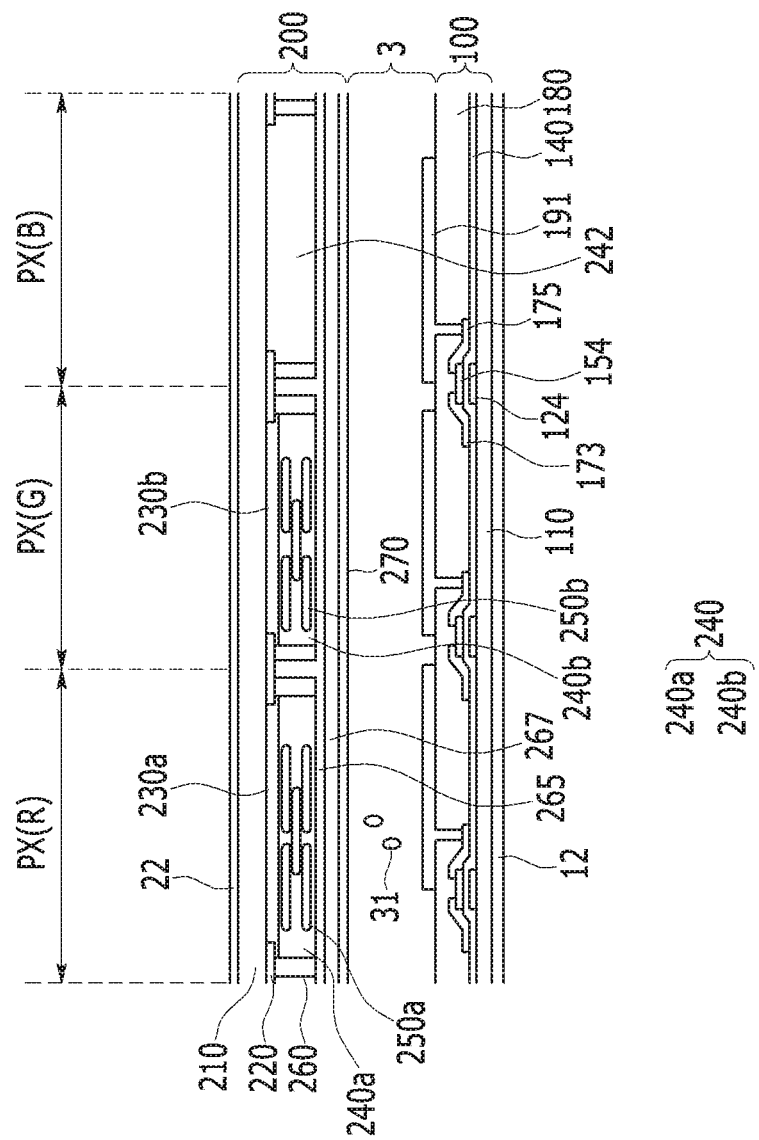
FIG. 5 is a cross-sectional view illustrating a liquid crystal display device according to an exemplary embodiment of the present invention.

FIG. 5 is a cross-sectional view illustrating a liquid crystal display device according to an exemplary embodiment of the present invention.

As illustrated in FIG. 5, a liquid crystal display device according to an exemplary embodiment of the present invention includes a thin film transistor array panel 100 and an opposing display panel 200 which face each other, and a liquid crystal layer 3 is disposed between the thin film transistor array panel 100 and the opposing display panel 200.

First, the thin film transistor array panel 100 will be described.

The gate electrode 124 is disposed on a first substrate 110 which is formed of a material such as transparent glass or plastic. Even though not illustrated, a gate line is formed on the first substrate 110 and the gate electrode 124 is connected to the gate line. A gate voltage is applied to the gate line and the gate voltage is transmitted to the gate electrode 124.

A gate insulating layer 140 is formed on the gate electrode 124. The gate insulating layer 140 may be formed of an inorganic insulating material, such as silicon nitride ($SiN_x$) or silicon oxide ($SiO_x$). Further, the gate insulating layer 140 may be formed as either a single layer or a multilayer.

A semiconductor 154 is formed on the gate insulating layer 140. The semiconductor 154 may be formed on the gate electrode 124. In some cases, the semiconductor 154 may be disposed below the data line 171. The semiconductor 154 may be formed of amorphous silicon, polycrystalline silicon, or metal oxide.

An ohmic contact member (not illustrated) may be further formed on the semiconductor 154. The ohmic contact may be formed of a material, such as n+ hydrogenated amorphous silicon, in which silicide or n-type impurity is doped at a high concentration.

A source electrode 173 and a drain electrode 175 are formed on the semiconductor 154. The source electrode 173 and the drain electrode 175 are spaced apart from each other. Even though not illustrated, a data line is formed on the semiconductor 154 and the gate insulating layer 140 and the source electrode 173 is connected to the data line. A data signal is applied to the data line and the data signal is transmitted to the source electrode 173.

The gate electrode 124, the source electrode 173, and the drain electrode 175 form a thin film transistor TFT together with the semiconductor 154. The thin film transistor may serve as a switching element which transmits the data voltage which is applied to the data line. A channel of the thin film transistor is formed in the semiconductor between the source electrode 173 and the drain electrode 175. When a gate-on voltage is applied to the gate electrode 124, the thin film transistor is turned on and the data voltage which is applied to the source electrode 173 is transmitted to the drain electrode 175.

A passivation layer 180 is formed on the source electrode 173, the drain electrode 175, and the semiconductor 154. The passivation layer 180 may be formed of an organic insulating material or an inorganic insulating material, and may be formed as either a single layer or a multilayer.

A contact hole 185 is formed in the passivation layer 180, and the contact hole 185 exposes at least a part of the drain electrode 175.

A pixel electrode 191 is formed on the passivation layer 180, and the pixel electrode 191 is connected to the drain electrode 175 through the contact hole 185. The pixel electrode 191 may be formed of transparent metal oxide, such as indium tin oxide (ITO) or indium zinc oxide (IZO).

A first polarizer 12 is disposed below the first substrate 110. The first polarizer 12 may be attached to the outside of the first substrate 110.

Next, the opposing display panel 200 will be described.

A light blocking member 220 is formed on the second substrate 210 which is formed of a material such as transparent glass or plastic. The first substrate 110 and the second substrate 210 face each other and, in this case, an inner surface of the first substrate 110 is considered as an upper surface and an outer surface thereof is considered as a lower surface, and an inner surface of the second substrate 210 is considered as an upper surface and an outer surface thereof is considered as a lower surface. Accordingly, in FIG. 5, it is described that the light blocking member 220 is disposed on the second substrate 210.

Each of the first substrate 110 and the second substrate 210 includes a first color pixel area PX(R), a second color pixel area PX(G), and a third color pixel area PX(B). The light blocking members 220 are disposed at boundaries between the pixel areas PX(R), PX(G), and PX(B). That is, the light blocking member 220 may be disposed at a boundary between the first color pixel area PX(R) and the second color pixel area PX(G), at a boundary between the second color pixel area PX(G) and the third color pixel area PX(B), and a boundary between the third color pixel area PX(B) and the first color pixel area PX(R). Further, the light blocking member 220 is disposed so as to overlap the thin film transistor.

The light blocking member 220 is formed of a material which may block the light and prevents light leakage. The light blocking member prevents light leakage at the boundary between the pixel areas PX(R), PX(G), and PX(B) and in a portion where the thin film transistor is formed.

A first blue light blocking filter 230a and a second blue light blocking filter 230b are formed on the second substrate 210. The first blue light blocking filter 230a is disposed in the first color pixel area PX(R) and the second blue light blocking filter 230b is formed in the second color pixel area PX(G). The light blocking member 220 is disposed between the first blue light blocking filter 230a and the second blue light blocking filter 230b.

The first blue light blocking filter 230a and the second blue light blocking filter 230b may absorb or reflect the blue light to block the blue light. The first blue light blocking filter 230a and the second blue light blocking filter 230b may be omitted if necessary.

A first color conversion layer 240a is formed on the first blue light blocking filter 230a. The first color conversion layer 240a is disposed in the first color pixel area PX(R). The first color conversion layer 240a includes a plurality of first quantum rods 250a and the plurality of first quantum rods 250a is arranged in a predetermined direction. The first quantum rod 250a may convert the wavelength of the incident light into a red wavelength.

The second color conversion layer 240b is formed on the second blue light blocking filter 230a. The second color conversion layer 240b is disposed in the second color pixel area PX(G). The second color conversion layer 240b includes a plurality of second quantum rods 250b and the plurality of second quantum rods 250b is arranged in a predetermined direction. The second quantum rod 250b may convert a wavelength of the incident light into a green wavelength.

The transparent photo resist 242 is formed on the second substrate 210. The transparent photo resist 242 is disposed in the third color pixel area PX(B). The transparent photo resist 242 passes light having all wavelengths. Therefore, when the blue light component is provided from the light source, the blue light component passes through the transparent photo resist 242. The transparent photo resist 242 may be omitted if necessary.

Partitions 260 are formed at a side of the first color conversion layer 240a, a side of the second color conversion layer 240b, and a side of the transparent photo resist 242. That is, the partitions 260 are disposed at boundaries of the pixel areas PX(R), PX(G), and PX(B). The partitions 260 may be disposed between the first color conversion layer 240a and the second color conversion layer 240b, between the second color conversion layer 240b and the transparent photo resist 242, and between the transparent photo resist 242 and the first color conversion layer 240a.

A planarization layer 265 is formed on the first color conversion layer 240a, the second color conversion layer 240b, and the transparent photo resist 242. The planarization layer 265 is disposed in an empty space between the partitions to planarize an upper surface. The planarization layer 265 may be omitted if necessary.

A blue band pass filter 267 is formed on the planarization layer 265. The blue band pass filter 267 may pass the blue light component as it is. The blue band pass filter 267 may be omitted if necessary.

A common electrode 270 is formed on the blue band pass filter 267. The common electrode 270 is formed on the entire second substrate 210. The common electrode 270 may be formed of transparent metal oxide such as indium tin oxide (ITO), indium zinc oxide (IZO). A predetermined voltage may be applied to the common electrode 270.

When the data voltage is applied to the pixel electrode 191 and a predetermined voltage is applied to the common electrode 270, an electric field is formed between the pixel electrode 191 and the common electrode 270. Accordingly, an electric field is generated in the liquid crystal layer 3 disposed between the pixel electrode 191 and the common electrode 270, and an orientation of liquid crystal molecule 31 in the liquid crystal layer 3 may be determined in accordance with the data voltage. A polarization direction of the light which passes through the liquid crystal layer 3 is determined in accordance with the determined direction of the liquid crystal molecule 31 and, thus, luminance of the each pixel area PX(R), PX(G), and PX(B) is determined.

A second polarizer 22 is disposed below the second substrate 210. The second polarizer 22 is attached to the outside of the second substrate 210. A transmissive axis of the second polarizer 22 is perpendicular to a transmissive axis of the first polarizer 12. Further, the arrangement direction of the first quantum rod 250a and the second quantum rod 250b is parallel to the transmissive axis of the second polarizer 22. Accordingly, the arrangement direction of the first quantum rod 250a and the second quantum rod 250b is perpendicular to the transmissive axis of the first polarizer 12.

Hereinafter, a manufacturing method of a liquid crystal display device according to an exemplary embodiment of the present invention will be described with reference to FIGS. 6 to 13.

FIGS. 6 to 13 are cross-sectional views of a process of a manufacturing method of a liquid crystal display device according to an exemplary embodiment of the present invention.

Figure 6:
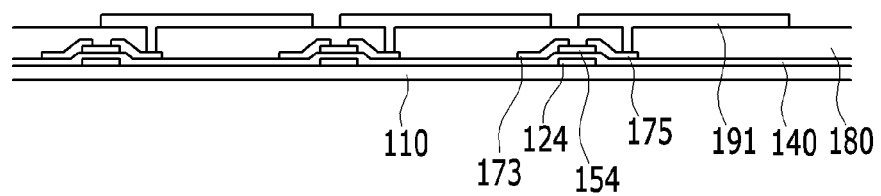
FIGS. 6 to 13 are cross-sectional views of a process of a manufacturing method of a liquid crystal display device according to an exemplary embodiment of the present invention.

First, as illustrated in FIG. 6, a gate electrode 124 is formed on a first substrate 110 which is formed of glass or plastic.

A gate insulating layer 140 is formed on the gate electrode 124 using an inorganic insulating material such as silicon nitride ($SiN_x$) or silicon oxide ($SiO_x$). The gate insulating layer 140 may be formed as either a single layer or a multilayer.

A semiconductor material, such as amorphous silicon, polycrystalline silicon, or a metal oxide, is deposited on the gate insulating layer 140 and then patterned to form a semiconductor 154. The semiconductor 154 may be formed to be disposed on the gate electrode 124.

After deposing and patterning a metal material on the semiconductor 154 and the gate insulating layer 140, a source electrode 173 and a drain electrode 175, which are spaced apart from each other are formed. The metal material may be formed as either a single layer or a multilayer.

After continuously depositing the semiconductor material and the metal material, the semiconductor material and the metal material are simultaneously patterned to form the semiconductor 154, the source electrode 173, and the drain electrode 175.

The gate electrode 124, the source electrode 173, and the drain electrode 175 form a thin film transistor TFT together with the semiconductor 154. The thin film transistor may serve as a switching element which transmits the data voltage. In this case, a channel of the switching element is formed in the semiconductor 154 between the source electrode 173 and the drain electrode 175.

A passivation layer 180 is formed on an exposed portion of the source electrode 173, the drain electrode 175, and the semiconductor 154. The passivation layer 180 may be formed of either an organic insulating material or an inorganic insulating material, and as either a single layer or a multilayer.

The passivation layer 180 is patterned to form a contact hole 185 to expose at least a part of the drain electrode 175.

Transparent metal oxide, such as indium tin oxide (ITO), and indium zinc oxide (IZO), is deposited on the passivation layer 180 and then patterned to form a pixel electrode 191.

Figure 7:
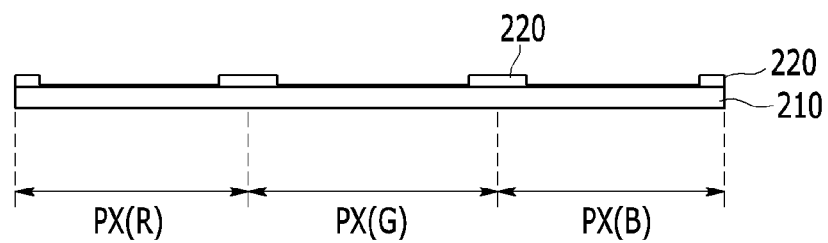

As illustrated in FIG. 7, a light shielding material is formed on the second substrate 210 which is formed of glass or plastic and then patterned to form a light blocking member 220. The light blocking member 220 is formed to be disposed at boundaries of the pixel areas PX(R), PX(G), and PX(B).

Figure 8:
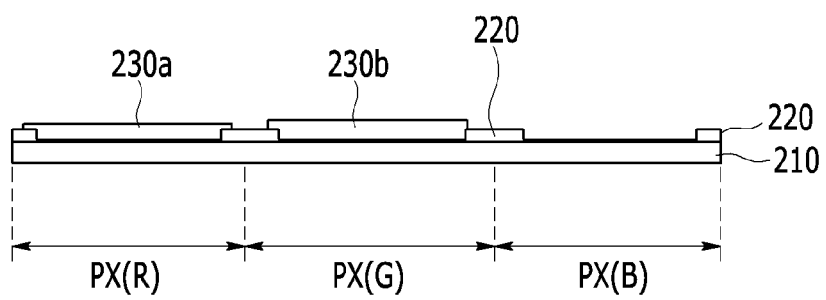

As illustrated in FIG. 8, a blue light blocking material is formed on the second substrate 210 and the light blocking member 220, and then patterned to form a first blue light blocking filter 230a and a second blue light blocking filter 230b. The first blue light blocking filter 230a and the second blue light blocking filter 230b may be formed by the same process using the same material, or by different processes using different materials.

Figure 9:
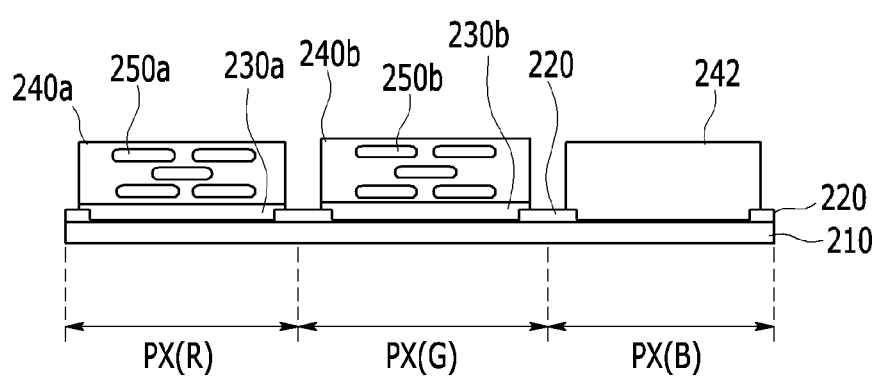

As illustrated in FIG. 9, a first color conversion layer 240a is formed on the first blue light blocking filter 230a. The first color conversion layer 240a is patterned to be disposed in the first color pixel area PX(R), and the first color conversion layer 240a includes first quantum rods 250a which are arranged in a predetermined direction.

A second color conversion layer 240b is formed on the second blue light blocking filter 230b. The second color conversion layer 240b is patterned to be disposed in the second color pixel area PX(G) and the second color conversion layer 240b includes second quantum rods 250b which are arranged in a predetermined direction.

A transparent photo resist 242 is formed on the second substrate 210. The transparent photo resist 242 is patterned to be disposed in the third color pixel area PX(B).

The first color conversion layer 240a, the second color conversion layer 240b, and the transparent photo resist 242 are patterned to have substantially the same height. The transparent photo resist 242 is formed to prevent a height difference between the pixel areas PX(R), PX(G), and PX(B).

Figure 10:
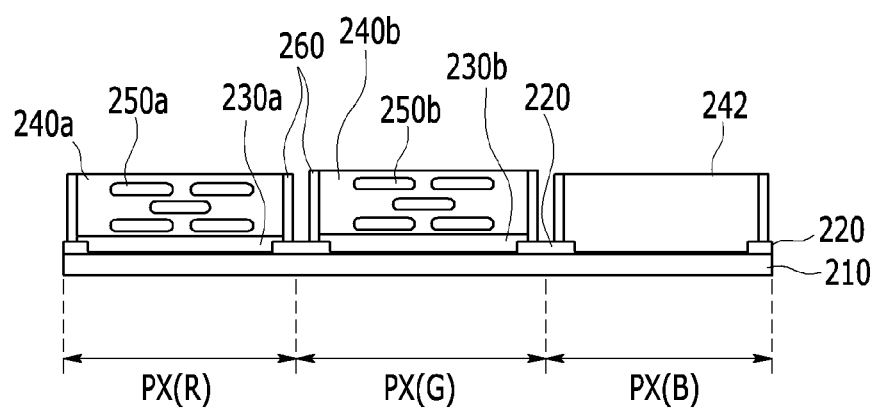

As illustrated in FIG. 10, partitions 260 are formed at the sides of the first color conversion layer 240a, the sides of the second color conversion layer 240b, and the sides of the transparent photo resist 242a using a reflective material and a light shielding material.

Figure 11:
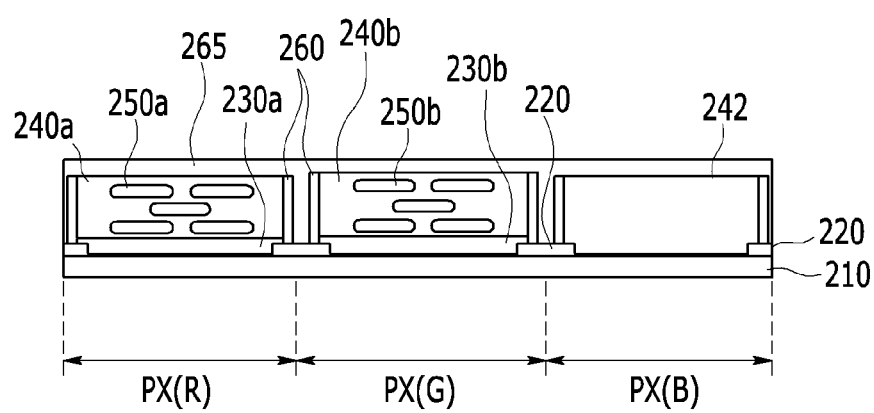

As illustrated in FIG. 11, a planarization layer 265 is formed on the first color conversion layer 240a, the second color conversion layer 240b, and the transparent photo resist 242.

Figure 12:
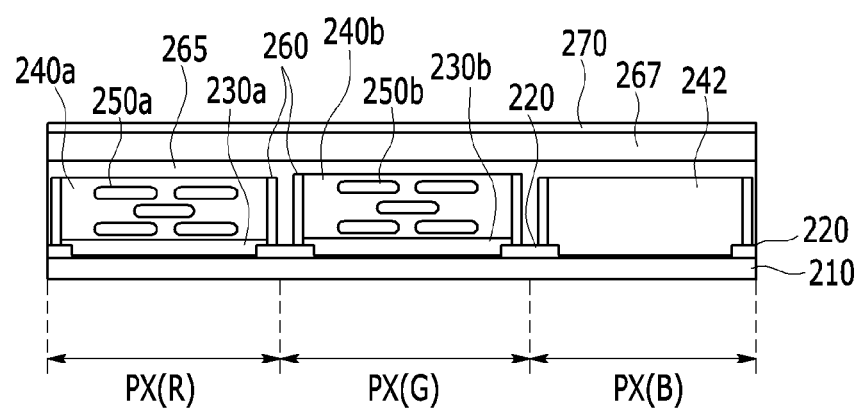

As illustrated in FIG. 12, a transparent metal oxide, such as indium tin oxide (ITO) or indium zinc oxide (IZO), is deposited on the planarization layer 265 to form a common electrode 270.

Figure 13:
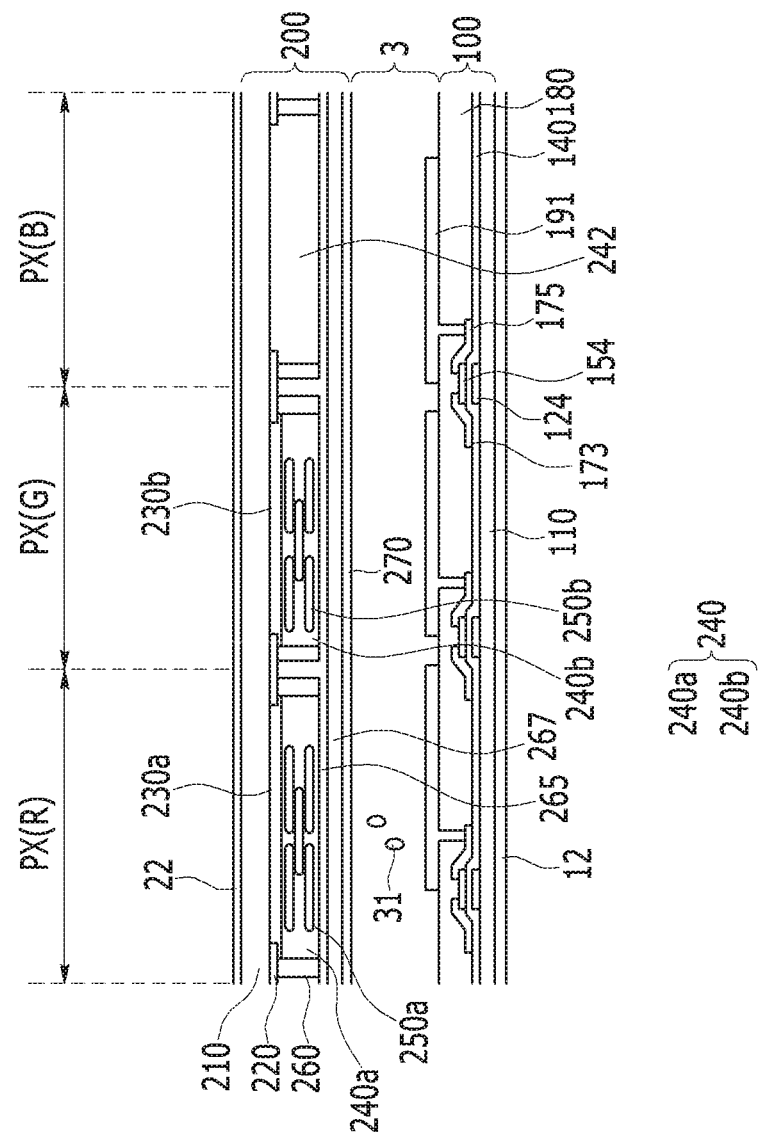

As illustrated in FIG. 13, the first substrate 110 and the second substrate 210 are bonded to each other, and a liquid crystal material is injected between the first substrate 110 and the second substrate 210 to form a liquid crystal layer 3.

Hereinafter, a color mixture preventing effect according to an exemplary embodiment of the present invention will be described with reference to FIGS. 14 to 16.

Figure 14:
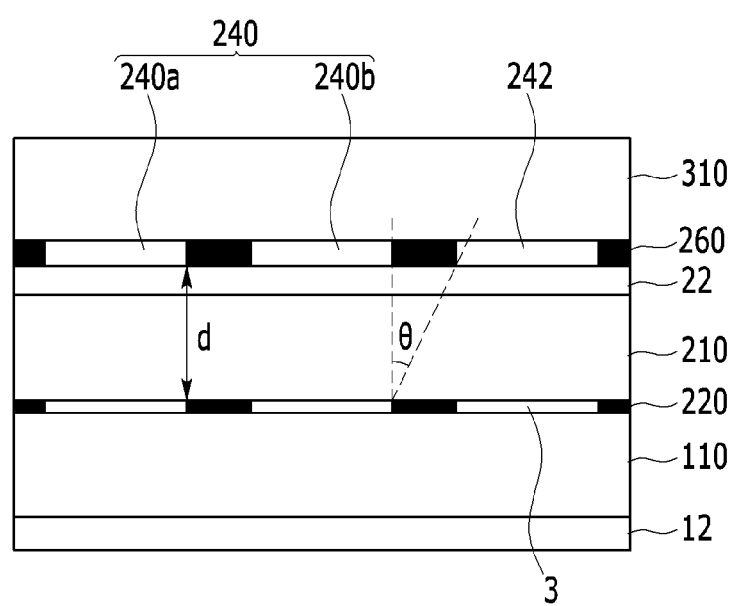
FIG. 14 is a cross-sectional view schematically illustrating a liquid crystal display device according to a first comparative example.
Figure 15:
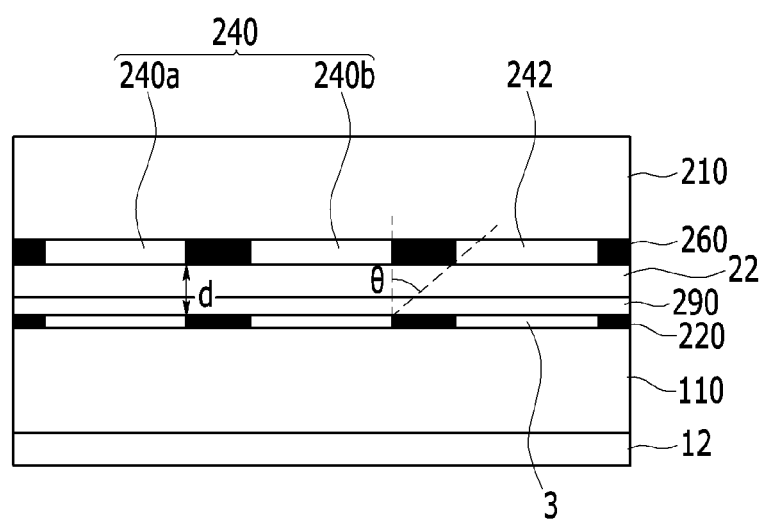
FIG. 15 is a cross-sectional view schematically illustrating a liquid crystal display device according to a second comparative example.
Figure 16:
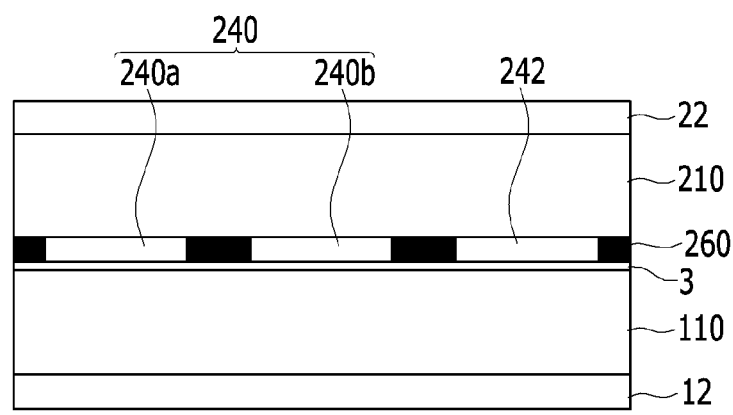
FIG. 16 is a cross-sectional view schematically illustrating a liquid crystal display device according to an exemplary embodiment of the present invention.

FIG. 14 is a cross-sectional view schematically illustrating a liquid crystal display device according to a first comparative example, FIG. 15 is a cross-sectional view schematically illustrating a liquid crystal display device according to a second comparative example, and FIG. 16 is a cross-sectional view schematically illustrating a liquid crystal display device according to an exemplary embodiment of the present invention.

As illustrated in FIG. 14, in a liquid crystal display device according to a first comparative example, a liquid crystal layer 3 is disposed between the first substrate 110 and the second substrate 210, and a color conversion layer 240 is formed on a separate third substrate 310. A first polarizer 12 is located outside the first substrate 110 and a second polarizer 22 is located outside the second substrate 210. Accordingly, the second substrate 210 and the second polarizer 22 are disposed between the liquid crystal layer 3 and the color conversion layer 240. Generally, a thickness of the substrate is approximately 100 μm and a thickness of the second polarizer 22 is approximately 60 μm. Therefore, a distance d between the liquid crystal layer 3 and the color conversion layer 240 is approximately 160 μm. In this case, when a width of the light blocking member 220, which is disposed between adjacent color conversion layers 240, is approximately 30 μm, an incident angle θ at which the color mixture occurs is approximately 10.4 degrees. That is, in the liquid crystal display device according to the first comparative example, when the incident angle θ of light which passes through the liquid crystal layer 3 is approximately 10.4 degrees or greater, the color mixture may occur.

As illustrated in FIG. 15, in a liquid crystal display device according to a second comparative example, a liquid crystal layer 3 is disposed on the first substrate 110 and an overcoat 290 is formed so as to cover the liquid crystal layer 3. A first polarizer 12 is disposed outside the first substrate 110 and a second polarizer 22 is disposed on the overcoat 290. A color conversion layer 240 is disposed between the second polarizer 22 and the second substrate 210. Accordingly, the overcoat 290 and the second polarizer 22 are disposed between the liquid crystal layer 3 and the color conversion layer 240. A thickness of the overcoat 290 may be approximately 10 μm, and a thickness of the second polarizer 22 may be approximately 60 μm. Therefore, a distance d between the liquid crystal layer 3 and the color conversion layer 240 is approximately 70 μm, which is reduced as compared with the distance in the first comparative example. In this case, when a width of the light blocking member 220, which is disposed between adjacent color conversion layers 240, is approximately 30 μm, an incident angle θ at which the color mixture occurs is approximately 22.3 degrees. That is, in the liquid crystal according to the second comparative example, when the incident angle θ of light which passes through the liquid crystal layer 3 is approximately 22.3 degrees or greater, the color mixture may occur. Therefore, the possibility of color mixture in the liquid crystal display device according to the second comparative example is lower than that of the first comparative example.

As illustrated in FIG. 16, in the liquid crystal display device according to an exemplary embodiment of the present invention, the liquid crystal layer 3 and the color conversion layer 240 are disposed between the first substrate 110 and the second substrate 210. A first polarizer 12 is disposed outside the first substrate 110, and a second polarizer 22 is disposed outside the second substrate 210. In the present exemplary embodiment, the second polarizer 22 is disposed outside the second substrate 210, which differs from the first comparative example and the second comparative example. Therefore, it is assumed that there is almost no interval between the liquid crystal layer 3 and the color conversion layer 240. In this case, when a width of the light blocking member 220 which is disposed between adjacent color conversion layers 240 is approximately 30 μm, an incident angle θ at which the color mixture occurs is approximately 84.3 degrees. That is, in the liquid crystal display device according to an exemplary embodiment of the present invention, when the incident angle θ of light which passes through the liquid crystal layer 3 is approximately 84.3 degrees or larger, the color mixture may occur. Therefore, the possibility of color mixture in the liquid crystal display device according to the exemplary embodiment of the present invention is much lower than either the first comparative example or the second comparative example.

Hereinafter, color reproducibility of a liquid crystal display device according to an exemplary embodiment of the present invention will be described.

Figure 17:
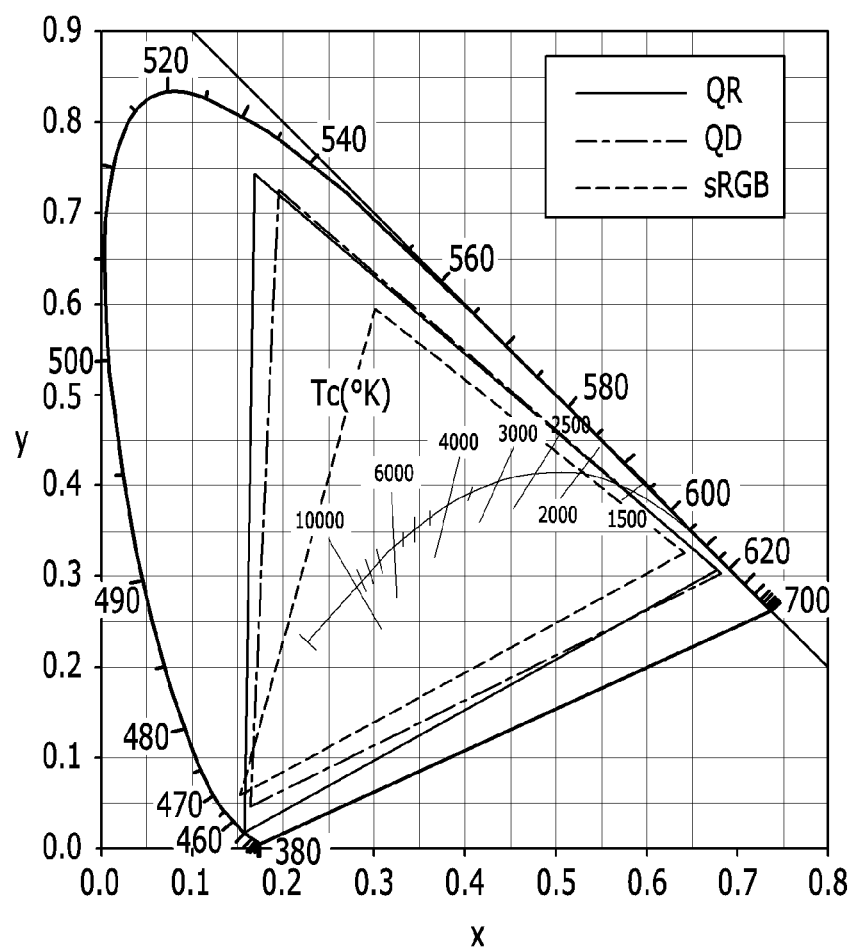
FIG. 17 is a result of simulation of color reproducibility according to an exemplary embodiment of the present invention.

FIG. 17 is a result of simulation of color reproducibility according to an exemplary embodiment of the present invention. For comparison, color reproducibility of a liquid crystal display device which uses a quantum dot QD instead of the quantum rod QR and color reproducibility of a general liquid crystal display device sRGB, which does not use a quantum material, are displayed.

As illustrated in FIG. 17, the liquid crystal display device that uses a quantum dot QD may reproduce a broader range of colors than the general liquid crystal display device sRGB. Color reproducibility of the liquid crystal display device using the quantum dot QD is approximately 110% of color reproducibility of the general liquid crystal display device sRGB. Further, the liquid crystal display device that uses a quantum rod QR may reproduce a broader range of colors than the liquid crystal display device sRGB, which uses a quantum dot QD. Color reproducibility of the liquid crystal display device using the quantum rod QR is approximately 119% of the color reproducibility of the general liquid crystal display device sRGB. That is, the liquid crystal display device according to an exemplary embodiment of the present invention provides higher color reproducibility using the quantum rod QR.

Hereinafter, a driving method of a liquid crystal display device according to an exemplary embodiment of the present invention will be described with reference to FIG. 18.

Figure 18:
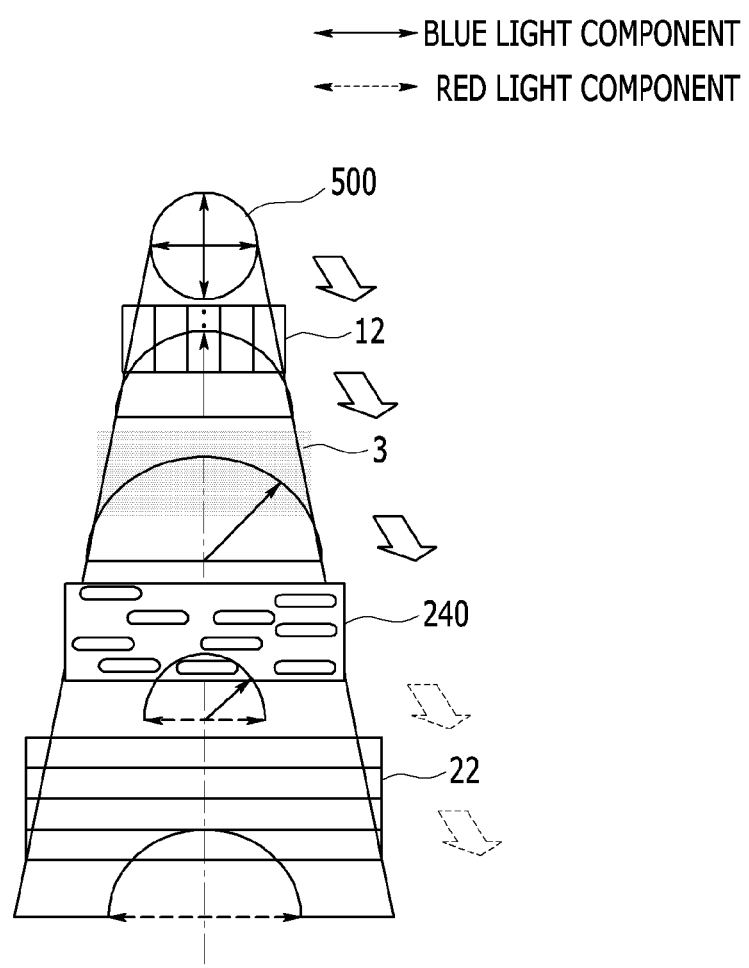
FIG. 18 is a view illustrating a polarization direction of light which passes through each constituent element of a liquid crystal display device according to an exemplary embodiment of the present invention.

FIG. 18 is a view illustrating a polarization direction of light which passes through each constituent element of a liquid crystal display device according to an exemplary embodiment of the present invention. FIG. 18 illustrates a first color pixel area in which red is displayed and a driving method which will be described below is also applied to the second color pixel area in which green is displayed.

First, a light source 500 provides light to a first polarizer 12. The light provided by the light source 500 is non-polarized light and formed of a blue light component.

The light provided from the light source is changed into a polarized light while passing through the first polarizer 12. Of light provided from the light source, a component which vibrates in a direction parallel to the transmissive axis of the first polarizer 12 passes through the first polarizer, and a component which vibrates in a direction perpendicular to the transmissive axis is blocked.

A polarization direction of the light which passes through the first polarizer 12 is changed while passing through the liquid crystal layer 3. As described above, in the liquid crystal layer 3, a direction of the liquid crystal molecules is determined in accordance with a strength of an electric field formed between the pixel electrode and the common electrode and, thus, a polarization direction of the light which passes through the liquid crystal layer 3 is determined. That is, a voltage is applied to the liquid crystal layer 3 to control the polarization direction of the light which passes through the first polarizer 12.

The quantity of light which passes through the liquid crystal layer 3 is adjusted while the light passes through the color conversion layer 240. An adjustment method of a quantity of light will be described with reference to FIG. 19.

Figure 19:
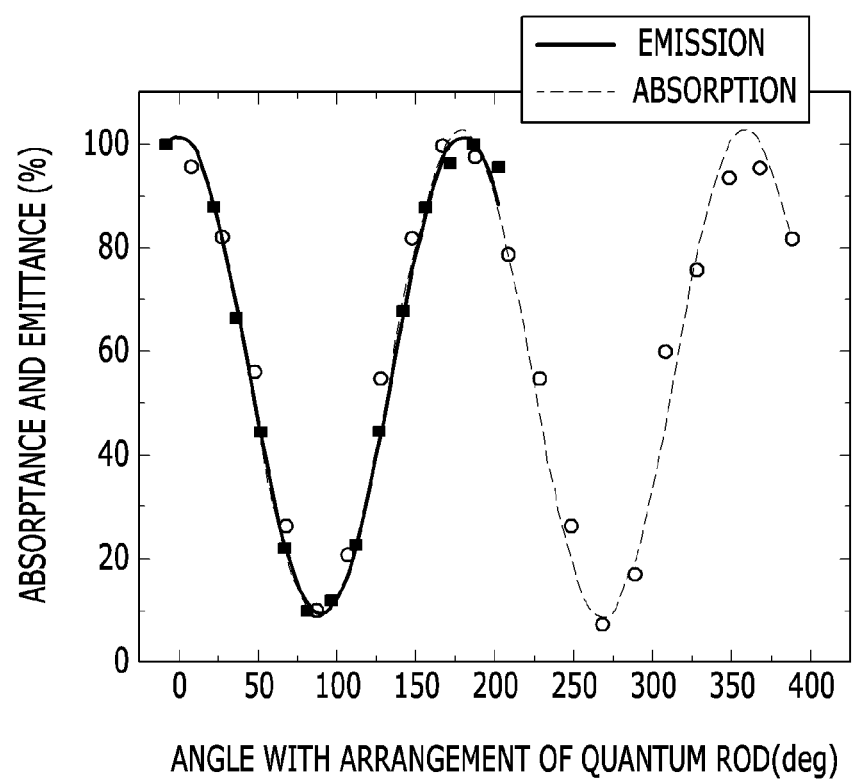
FIG. 19 is a graph illustrating absorptance and light emittance in accordance with an angle formed by a polarization direction of incident light and an alignment direction of a quantum rod.

FIG. 19 is a graph illustrating absorptance and light emittance in accordance with an angle formed by a polarization direction of incident light and an alignment direction of a quantum rod.

As illustrated in FIG. 19, when an angle formed by a polarization direction of the light that is incident onto the quantum road and an arrangement direction of the quantum rod is zero degree or 180 degrees, the absorptance and the light emittance are maximized. Further, when an angle formed by a polarization direction of the light that is incident onto the quantum road and an arrangement direction of the quantum rod is 90 degrees, the absorptance and light emittance are minimized.

Therefore, the quantity of light that passes through the color conversion layer 240 is determined by an angle formed by formed by a polarization direction of the light that passes through the liquid crystal layer 3 and the arrangement direction of the quantum rod included in the color conversion layer 240. The arrangement direction of the quantum rod is formed in a direction that is parallel to the transmissive axis of the second polarizer 22.

Referring to FIG. 18 again, since the angle formed by a polarization direction of the light that passes through the liquid crystal layer 3 and the arrangement direction of the quantum rod is greater than zero degrees, the quantity of light is reduced while passing through the color conversion layer 240. In this case, the light that passes through the liquid crystal layer 3 is a blue light component, and most of the blue light component is changed into a red component. In this case, some of blue light components passes through the color conversion layer 240, but the blue light component is blocked by the blue light blocking filter (not illustrated) such that only the red color component passes therethrough.

The light which passes through the color conversion layer 240 passes through the second polarizer 22 and shows a predetermined luminance.

Hereinafter, a method of representing gray scales will be described with reference to FIGS. 20 to 22.

Figure 20:
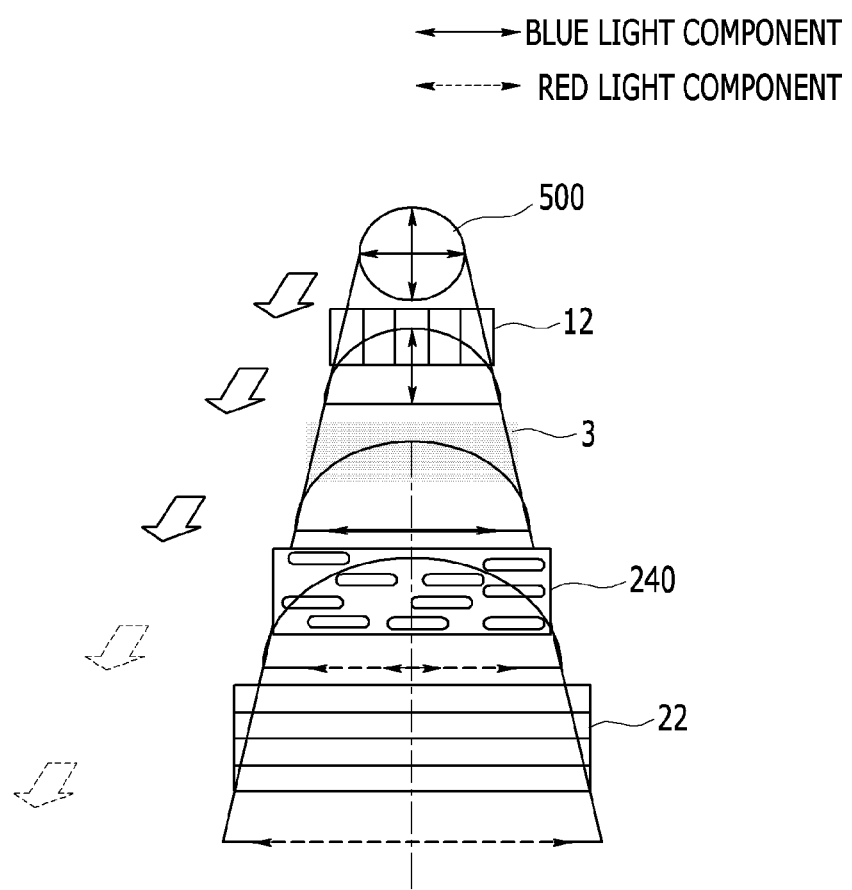
FIG. 20, FIG. 21, and FIG. 22 are views illustrating a polarization direction of light which passes through each constituent element of a liquid crystal display device according to an exemplary embodiment of the present invention.
Figure 21:
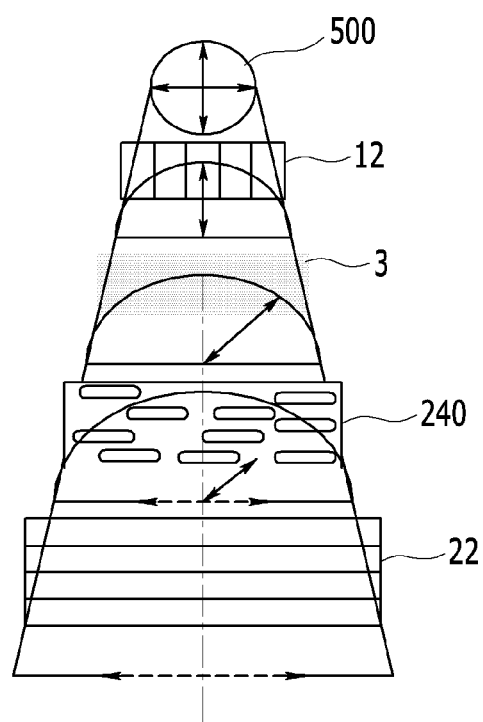
Figure 22:
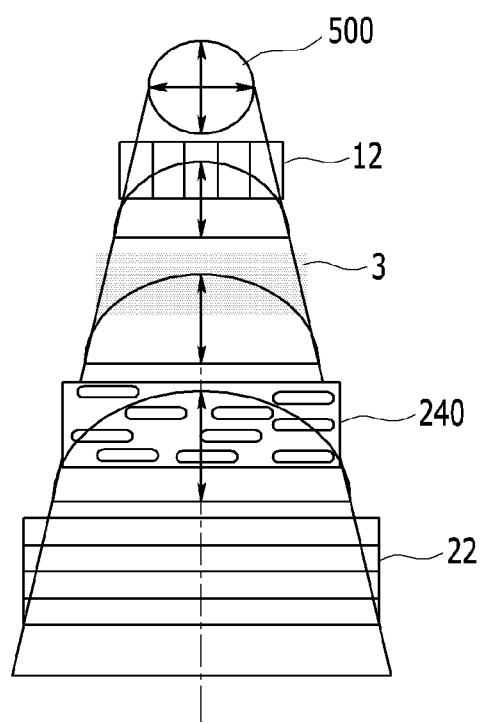

FIGS. 20 to 22 are views illustrating a polarization direction of light which passes through each constituent element of a liquid crystal display device according to an exemplary embodiment of the present invention. FIG. 20 illustrates a maximum gray scale, FIG. 21 illustrates an intermediate gray scale, and FIG. 22 illustrates a minimum gray scale.

As illustrated in FIG. 20, a predetermined electric field is generated in the liquid crystal layer 3 so that the polarization direction of the light is controlled to rotate by approximately 90 degrees while passing through the liquid crystal layer 3.

The polarization direction of the light that passes through the liquid crystal layer 3 is parallel to the arrangement direction of the quantum rod of the color conversion layer 240, so that most of the light passes through the color conversion layer 240, and the highest luminance may be obtained. By doing this, a maximum gray scale, that is, white may be displayed.

As illustrated in FIG. 21, a predetermined electric field is generated in the liquid crystal layer 3 so that the polarization direction of the light is controlled to rotate by approximately 45 degrees while passing through the liquid crystal layer 3.

The polarization direction of the light that passes through the liquid crystal layer 3 and the arrangement direction of the quantum rod of the color conversion layer 240 form an angle of approximately 45 degrees, so that some of light passes through the color conversion layer 240 and the remaining light does not pass through the color conversion layer 240 and blocked. Thus, an intermediate gray scale may be displayed.

As illustrated in FIG. 22, the electric field is not formed on the liquid crystal layer 3 so that the polarization direction of the light is controlled so as not to be changed while passing through the liquid crystal layer 3.

The polarization direction of the light that passes through the liquid crystal layer 3 and the arrangement direction of the quantum rod of the color conversion layer 240 form an angle of 90 degrees so that most of the light does not pass through the color conversion layer 240 to be blocked. By doing this, a minimum gray scale, that is, black may be displayed.

Hereinafter, a relationship between a rotational angle of the polarization direction and luminance of the light which passes through the liquid crystal layer will be described with reference to FIG. 23.

Figure 23:
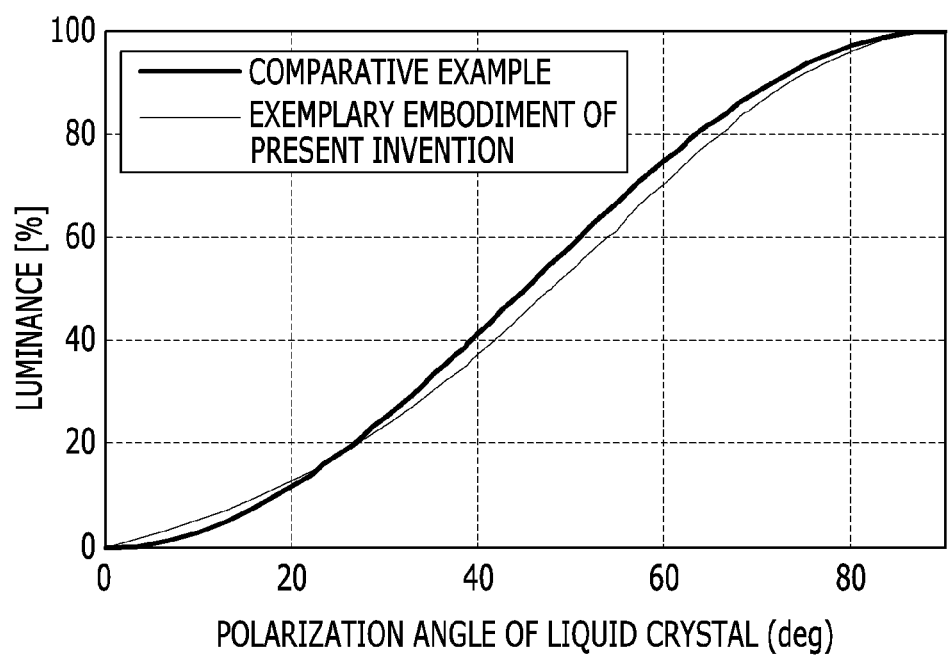
FIG. 23 is a graph illustrating luminance in accordance with a polarization angle of liquid crystal.

FIG. 23 is a graph illustrating luminance in accordance with a polarization angle of liquid crystal. A polarization angle of the liquid crystal refers to an angle at which a polarization direction of light which passes through a liquid crystal layer rotates. FIG. 23 also illustrates a graph representing a luminance in accordance with a polarization angle of the liquid crystal display device according to a comparative example. In the comparative example, a general crystal display does not use the quantum material.

A gray scale in the liquid crystal display device according to an exemplary embodiment of the present invention will be determined by Equation 1.

[Equation 1]

$$G = A\cos^4(P_\theta) + C\cos^2(P_\theta) + D\cos(P_\theta) + E$$

(G: gray scale, $P_\theta$: angle of polarization of liquid crystal)

As illustrated in FIG. 23, the change of luminance in accordance with polarization angle of the liquid crystal in the liquid crystal display device according to the exemplary embodiment of the present invention is different from the change of luminance in accordance with the polarization angle of the liquid crystal in the liquid crystal display device according to the comparative examples.

In the liquid crystal display device according to exemplary embodiments of the present invention as described above, a distance between a liquid crystal layer and a color conversion layer is minimized to prevent the color mixing phenomenon.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device, comprising:
    a first substrate and a second substrate facing each other, each of the first substrate and the second substrate comprising a first color pixel area, a second color pixel area, and a third color pixel area;
    a thin film transistor disposed inside the first substrate;
    a color conversion layer disposed inside the second substrate, the color conversion layer comprising:
        a first color conversion layer disposed in the first color pixel area and configured to change incident light into a red light component and comprising a first quantum rod;
        a second color conversion layer disposed in the second color pixel area and configured to change incident light into a green light component and comprising a second quantum rod; and
        a transparent photo resist disposed in the third color pixel area;
    a liquid crystal layer disposed between the first substrate and the second substrate;
    a blue band pass filter disposed between the color conversion layer and the liquid crystal layer;
    a planarization layer disposed between the color conversion layer and the liquid crystal layer;
    a first polarizer disposed at an outside of the first substrate;
    a second polarizer disposed at an outside of the second substrate;
    a first blue light blocking filter disposed between the second substrate and the first color conversion layer;
    a second blue light blocking filter disposed between the second substrate and the second color conversion layer; and
    a light blocking member disposed at boundaries between the first color pixel area, the second color pixel area, and the third color pixel area,
    wherein:
    the light blocking member is arranged to extend between the first blue light blocking filter and the second blue light blocking filter;
    light emitted from the first color pixel area passes through the liquid crystal layer, the first quantum rod, the second substrate, and the second polarizer in this order;
    light emitted from the second color pixel area passes through the liquid crystal layer, the second quantum rod, the second substrate, and the second polarizer;
    light emitted from the third color pixel area passes through the liquid crystal layer, the transparent photo resist, the second substrate, and the second polarizer in this order;
    in the first and second color pixel areas, an arrangement direction of the first and the second quantum rods and a transmissive axis of the second polarizer are parallel to each other;
    the light emitted in the third color pixel area does not pass through quantum rods;
    the planarization layer is disposed in a space between the first color conversion layer, the second color conversion layer, and the transparent photoresist;
    a plurality of partitions are disposed at sides of the first color conversion layer, the second color conversion layer, and the transparent photo resist, the partitions comprising a reflective material and a light shielding material;
    a plurality of the blue band pass filters are disposed in the first color pixel area, the second color pixel area, and the third color pixel area; and
    the plurality of the blue band pass filters disposed in the first color pixel area, the second color pixel area, and the third color pixel area are spaced apart from each other.

2. The liquid crystal display device of claim 1, wherein the transparent photo resist is disposed on the same layer as the first color conversion layer and the second color conversion layer.

3. The liquid crystal display device of claim 2, wherein the transparent photo resist is thicker than the first color conversion layer and the second color conversion layer.

4. The liquid crystal display device of claim 1, further comprising a blue band pass filter disposed between the color conversion layer and the liquid crystal layer.

5. The liquid crystal display device of claim 4, wherein the blue band pass filter is disposed in the first color pixel area, the second color pixel area, and the third color pixel area.

6. The liquid crystal display device of claim 1, further comprising a light source configured to provide a blue light component to the first substrate.

7. A driving method of a liquid crystal display device, the liquid crystal display device including a first substrate and a second substrate facing each other, each of the first substrate and the second substrate comprising a first color pixel area, a second color pixel area, and a third color pixel area, the method comprising:
    providing light to a first polarizer of the liquid crystal display device;
    applying a voltage to a liquid crystal layer to control a polarization direction of light which passes through the first polarizer;
    adjusting a quantity of light which passes through the liquid crystal layer while passing through a color conversion layer disposed in the second substrate, the color conversion layer comprising:
        a first color conversion layer disposed in the first color pixel area and configured to change incident light into a red light component and comprising a first quantum rod;

a second color conversion layer disposed in the second color pixel area and configured to change incident light into a green light component and comprising a second quantum rod; and a transparent photo resist disposed in the third color pixel area; and passing the light which passes through the color conversion layer through a second polarization layer, wherein:

a first blue light blocking filter is formed between the second substrate and the first color conversion layer;

a second blue light blocking filter is formed between the second substrate and the second color conversion layer;

a light blocking member is formed at boundaries between the first color pixel area, the second color pixel area, and the third color pixel area, the light blocking member being arranged to extend between the first blue light blocking filter and the second blue light blocking filter;

light emitted from the first color pixel area passes through the liquid crystal layer, the first quantum rod, the second substrate, and the second polarizer in this order;

light emitted from the second color pixel area passes through the liquid crystal layer, the second quantum rod, the second substrate, and the second polarizer;

light emitted from the third color pixel area passes through the liquid crystal layer, the transparent photo resist, the second substrate, and the second polarizer in this order;

in the first and second color pixel areas, an arrangement direction of the first and the second quantum rods and a transmissive axis of the second polarizer are parallel to each other, and the light emitted in the third color pixel area does not pass through quantum rods;

the liquid crystal display device further comprises a planarization layer disposed between the color conversion layer and the liquid crystal layer;

a blue band pass filter is disposed between the color conversion layer and the liquid crystal layer;

the planarization layer is disposed in a space between the first color conversion layer, the second color conversion layer, and the transparent photoresist;

a plurality of partitions are disposed at sides of the first color conversion layer, the second color conversion layer, and the transparent photo resist, the partitions comprising a reflective material and a light shielding material;

a plurality of the blue band pass filters are disposed in the first color pixel area, the second color pixel area, and the third color pixel area; and the plurality of the blue band pass filters disposed in the first color pixel area, the second color pixel area, and the third color pixel area are spaced apart from each other.

8. The driving method of claim 7, wherein:

as an angle formed by the polarization direction of light which passes through the liquid crystal layer and an arrangement direction of the quantum rod approaches zero, the quantity of light which passes through the color conversion layer is increased; and as an angle formed by the polarization direction of light which passes through the liquid crystal layer and the arrangement direction of the quantum rod approaches 90 degrees, the quantity of light which passes through the color conversion layer is reduced.

9. The driving method of claim 7, wherein the quantum rods are arranged in a predetermined direction, and the arrangement direction of the quantum rods is parallel to the transmissive axis of the second polarizer.

10. The driving method of claim 7, wherein the light provided to the first polarizer is a blue light component.

11. The driving method of claim 10, wherein a blue light component which is not changed into a red light component among the light which passes through the first color conversion layer is blocked by the first blue light blocking filter.

12. The driving method of claim 10, wherein a blue light component which is not changed into a green light component among the light which passes through the second color conversion layer is blocked by the second blue light blocking filter.

13. The driving method of claim 7, wherein:

the transparent photo resist is disposed on the same layer as the first color conversion layer and the second color conversion layer; and the transparent photo resist is thicker than the first color conversion layer and the second color conversion layer.

* * * * *